United States Patent
Snell et al.

(10) Patent No.: US 9,039,070 B2
(45) Date of Patent: May 26, 2015

(54) CRASH LOAD ABSORPTION STRUCTURES FOR MOTOR VEHICLES

(75) Inventors: Roland Snell, Warwick (GB); Matthew Hobbs, Warwick (GB)

(73) Assignee: ASTON MARTIN LAGONDA LIMITED, Gaydon (GB)

(*) Notice: Subject to any disclaimer, the term of this patent is extended or adjusted under 35 U.S.C. 154(b) by 0 days.

(21) Appl. No.: 13/014,608

(22) Filed: Jan. 26, 2011

(65) Prior Publication Data
US 2012/0181803 A1    Jul. 19, 2012

(30) Foreign Application Priority Data

Jan. 14, 2011 (GB) .................................. 1100653.3

(51) Int. Cl.
| | | |
|---|---|---|
| *B62D 21/15* | (2006.01) | |
| *B62D 25/08* | (2006.01) | |
| *F27B 9/20* | (2006.01) | |
| *F27B 9/24* | (2006.01) | |
| *F27B 9/36* | (2006.01) | |
| *F27B 9/38* | (2006.01) | |

(Continued)

(52) U.S. Cl.
CPC .............. *B62D 21/15* (2013.01); *B62D 21/155* (2013.01); *B62D 25/08* (2013.01); *B62D 25/082* (2013.01); *B62D 21/152* (2013.01); *F27B 9/205* (2013.01); *F27B 9/24* (2013.01); *F27B 9/36* (2013.01); *F27B 9/38* (2013.01); *F27D 2003/0015* (2013.01); *F27D 2099/0058* (2013.01); *F27M 2001/1556* (2013.01)

(58) Field of Classification Search
CPC ...... B62D 21/11; B62D 21/15; B62D 21/152; B62D 21/155; B62D 25/08; B62D 25/082; B62D 25/085; B60R 19/24; B60R 19/26; B60R 19/34

USPC ............... 296/187.03, 187.09, 187.1, 193.01, 296/193.09, 203.02, 205; 293/132, 133
See application file for complete search history.

(56) References Cited

U.S. PATENT DOCUMENTS 7,213,873 B2 * 5/2007 Murata et al. .................. 296/204
7,407,192 B2 * 8/2008 Yoshimura ..................... 280/784
(Continued)

FOREIGN PATENT DOCUMENTS

DE    4022137    1/1992
EP    1361099 A2    11/2003
(Continued)

OTHER PUBLICATIONS

United Kingdom Search Report dated Apr. 18, 2011, UK Application No. 1100653.3, 1 page.
(Continued)

*Primary Examiner* — Jason S Daniels
(74) *Attorney, Agent, or Firm* — Dorsey & Whitney LLP

(57) ABSTRACT

A crash load absorption structure for a motor vehicle. The structure includes a compressible load absorbing structure. The compressible load absorbing structure includes a front portion and a rear portion. The front portion and the rear portion are arranged to compress under a crash load along a generally longitudinal direction. The compressible load absorbing structure also includes a structural joint located within the compressible load absorbing structure, the joint is between at least two structural members. A load transfer element is configured to promote breaking of the structural joint during a vehicle crash.

35 Claims, 14 Drawing Sheets

(51) Int. Cl.
*F27D 3/00* (2006.01)
*F27D 99/00* (2010.01)

(56) References Cited

U.S. PATENT DOCUMENTS

| | | | |
|---|---|---|---|
| 2003/0090127 A1* | 5/2003 | Saeki | 296/188 |
| 2008/0197672 A1* | 8/2008 | Yamaguchi et al. | 296/187.09 |
| 2009/0315311 A1 | 12/2009 | Tamakoshi | |
| 2010/0201159 A1 | 8/2010 | Chretien et al. | |

FOREIGN PATENT DOCUMENTS

| | | |
|---|---|---|
| FR | 2887211 | 12/2006 |
| JP | 2002240738 | 8/2002 |
| JP | 2007203806 | 8/2007 |

OTHER PUBLICATIONS

European Patent Office; Extended European Search Report; Application No. EP 12151134.9; Apr. 4, 2013; 8 pages.

* cited by examiner

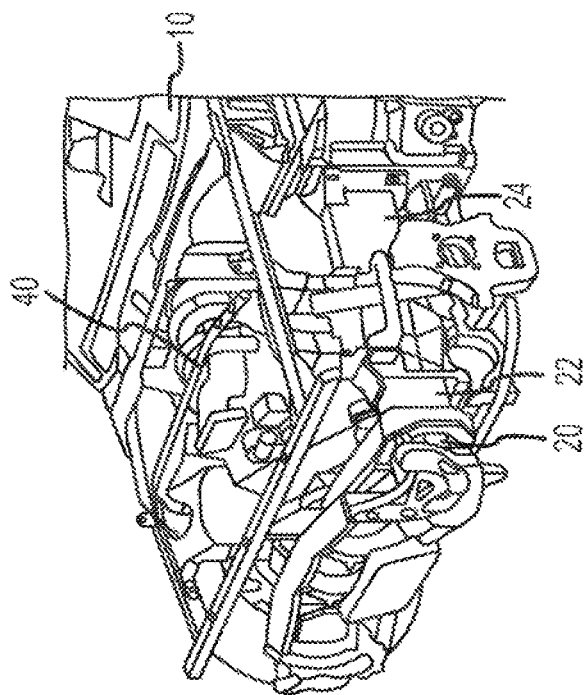
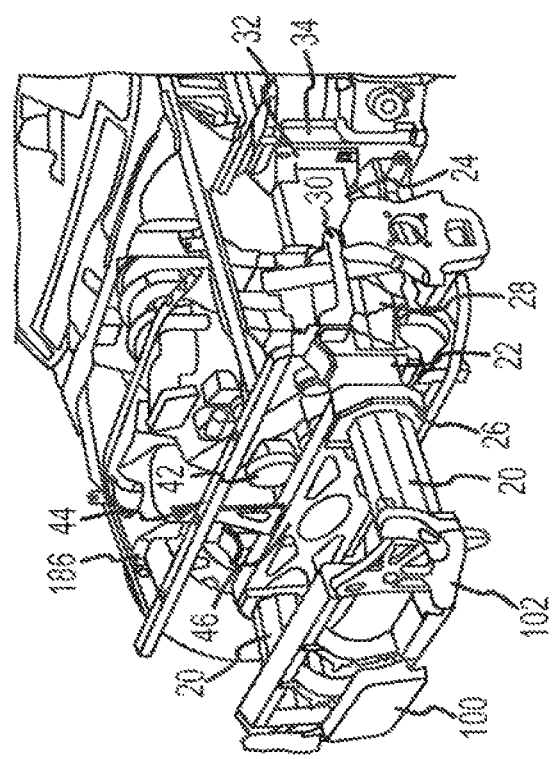
FIG.2A PRIOR ART
FIG.2B PRIOR ART

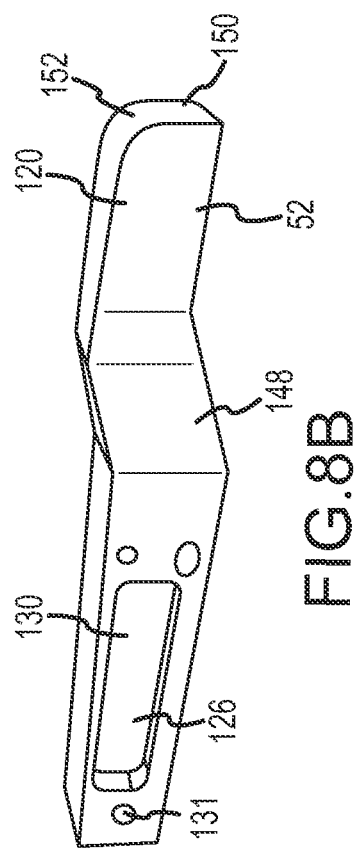
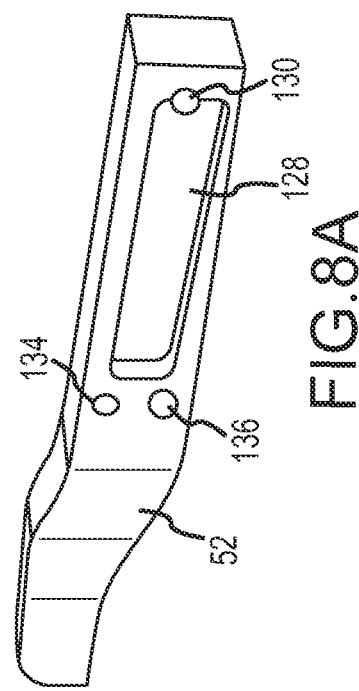
FIG. 8B
FIG. 8A

CRASH LOAD ABSORPTION STRUCTURES FOR MOTOR VEHICLES

CROSS REFERENCE TO RELATED APPLICATIONS

This application claims priority to United Kingdom application no. 1100653.3 filed 14 Jan. 2011 entitled "Crash Load Absorption Structures for Motor Vehicles," which is hereby incorporated herein by reference in its entirety.

TECHNICAL FIELD

The present invention relates to crash load absorption structures for motor vehicles, and to motor vehicles containing such structures.

BACKGROUND

Production motor cars are required to pass various safety tests to ensure that they are sufficiently safe for use on public roads. It is desirable that the occupants of a motor car do not suffer injury when the motor car is in a collision. Therefore, at least one of the tests a motor car type has to pass is to ensure that a motor vehicle occupant will not suffer an acceleration higher than a certain amount during a collision. One of the safety tests carried out for vehicles is the United States of America Federal front impact test when the motor car is projected forwards at a speed of 35 miles per hour (15.65 meters per second) into a substantially solid immovable flat wall arranged perpendicular to the direction of motion of the motor car. This test therefore simulates what may happen if a motor car is accidentally driven directly into a solid and substantially immovable object such as a reinforced concrete bridge support at the side of the road or a very heavy vehicle.

FIG. 1 shows part-schematically a known motor vehicle type undergoing the United States of America Federal front impact test. As shown, the motor car 10 has four wheels 12 and is projected into the flat front, wall 14 of a substantially rigid immovable object 16. During the collision, a front crash load absorption structure 18 deforms as shown in FIGS. 2A to 2D. The front crash load absorption structure 18 has on each side of the car a primary crush can 20, a secondary crush can 22 and a tertiary crush can 24. The primary, secondary and tertiary crush cans 20, 22, 24 are permanently deformably crushable. The primary crush can 20 and secondary crush can 22 are joined together by an interface casting 26 and the secondary crush can 22 and tertiary crush can 24 are joined together by an upper wishbone casting 28 onto which an upper wishbone 30 of the front suspension is mounted. The tertiary crush can 24 is connected by a rear interface casting 32 to a front structure mounting member 34 of the body structure of the motor car 10.

As shown by the sequence of views from FIG. 2A to 2D, the crush cans 20, 22, 24, and also parts 186 and 96 are engineered to provide increasing crush strength from front to rear. Can 24, brackets 186 and underfloor longitudinal member 96 initiate at sufficiently high load to allow suitable crush of 20 and 22. Accordingly, during the collision, the primary crush cans 20 are first longitudinally crushed from the pre-collision configuration of FIG. 2A to the configuration of FIG. 2B in which the primary crush cans 20 are crushed, but the secondary 22 and tertiary 24 crush cans are still substantially undeformed. As the collision continues to the configuration of FIG. 2C, the secondary crush cans 22 are then crushed with the tertiary crush can 24 remaining substantially undeformed. As the collision continues to the configuration of FIG. 2D, the tertiary crush cans 24 and the underfloor 96 and brackets 186 are next at least partially crushed. After the collision, the primary, secondary and tertiary crush cans 20, 22 24 remain in substantially the crushed configuration shown in FIG. 2D. This sequential crush system has been considered highly advantageous since, dependent upon the extent of the collision, parts further back in the vehicle may not be damaged and may not need replacing and the cost of repairing relatively minor collisions can be minimised. Also, the sequential crush system is relatively predictable and parts of the vehicle further towards the rear where the occupants are located are not easily deformed such that the occupants 36, 38 are maintained safely in their occupant space 48 with only a negligible deformation of this space in relatively minor collisions.

The motor car 10 shown in FIG. 1 and FIGS. 2A to 2D has performed very well in front impact tests and it is noted that this vehicle has a 4.7 litre V8 engine 40 which has a relatively short block 42 leaving a sizable gap 44 longitudinally between the engine block 42 and structural cross-members 46 joining the two sides of the front crash load absorption structure 18 in the region of the interface castings 26.

However, in certain cases, it may be desirable from a product definition point of view to use an engine with a longer block whereby it may be more difficult to achieve good low acceleration of the occupants 36, 38, especially the driver who has a more confined space due to the steering wheel and a smaller main front airbag than the front passenger during frontal impacts.

The present invention aims to alleviate at least to a certain extent the problems and/or address at least to a certain extent the difficulties of the prior art.

SUMMARY

According to a first aspect of the present invention there is provided a crash load absorption structure for a motor vehicle, the structure comprising a compressible load absorbing structure having a front portion and a rear portion and being arranged to compress under a crash load along a generally longitudinal direction, and a load transfer element for applying crash load to the load absorbing structure at a location part-way along the load absorbing structure.

The load transfer element may apply the crash load directly to the load absorbing structure at the location part-way along the load absorbing structure. The load transfer element advantageously may promote a lower energy mode of compression or collapse of the load absorbing structure in a crash and may extend the duration of the acceleration pulse and/or increase the time that a motor vehicle takes to decelerate to zero velocity and/or provide a lower acceleration for the driver and/or other occupants during a crash. The load transfer element may advantageously affect frontal impact performance, such as in the United States of America Federal front impact test without being detrimental to the behaviour of the vehicle in other tests which the vehicle must pass such as an offset front impact test. Whereas prior thinking has been to engineer a sequential collapse such as in three stages sequentially from front to back in a frontal collision as shown in FIGS. 2A to 2D, the load transfer element can initiate a compression or collapse/crushing part-way along the load absorbing structure early on in the crash sequence and at low load. Given that the crash sequence is not necessarily sequential in stages e.g. from front to back through primary, secondary and tertiary collapsible structures in at least some embodiments in accordance with the invention, good performance can nevertheless be achieved. This jump away from prior thinking in the present invention is considered highly innovative. The acceleration of the driver during the deceleration of a crash may therefore surprisingly be lowered and the likelihood of occupant injury is lowered. Many occupant criteria are generally linked to acceleration.

Each of the three crush stages requires a certain amount of energy to overcome its initiation load. In the prior three-stage sequential collapse, for a particular vehicle weight, the remaining inertia available after crush of the first two stages may be insufficient to overcome the tertiary stage initiation load. This results in an increased deceleration of the vehicle as it is approaching zero velocity, which is not likely to provide such good performance for occupant injury levels. The load transfer element causes the tertiary crush stage initiation to occur earlier in the crash sequence whilst there is still ample inertia available to overcome its initiation load. The short blip in force due to this earlier initiation has a less detrimental effect on the occupant deceleration than the prior arrangement, hence lower occupant injury levels.

According to a second aspect of the present invention there is provided a crash load absorption structure for a motor vehicle, the structure comprising a compressible load absorbing structure having a front portion and a rear portion and being arranged to compress under a crash load along a generally longitudinal direction, a structural joint being located within the compressible load absorbing structure, the joint being between at least two structural members, and a load transfer element which is arranged to promote breaking of the structural joint during vehicle crash.

The promotion of breaking of a structural joint between two structural members is advantageous in certain circumstances. It can result in a longer duration for the deceleration of the vehicle to zero velocity and a lower acceleration for the driver during a frontal impact. The structural joint may be between a front lower sub-frame member, and an upper structural member, such as part of a suspension tower assembly and/or an upper wishbone member or casting, in which case the lower sub-frame member may be suitable for the location thereon of at least one lower suspension wishbone, and both of the lower sub-frame member and upper structural element may be solid castings or of other construction making them substantially rigid and uncrushable during vehicle crash. The load absorbing structure may be a longitudinal structure incorporating one of these members, such as the upper structural member, and may have compressible elements either sides of it, such as in front of and behind it, longitudinally in line. The promotion of breaking of the structural joint by the load transfer element is highly advantageous since it has been found that the length of the load transfer element can be tuned to affect the time at which it receives load during collision and therefore the time at which it transfers load to the load absorbing structure, such as the upper structural element thereof, so that the point or time in the collision at which the structural joint breaks can be tuned, which is useful when modifying or engineering new vehicle platforms. This, in turn, can enable the behaviour of parts of the load absorbing structure distant from the point at which the crash impact is applied to the load absorbing structure to be tuned so as to allow more easily a compression thereof earlier in the collision sequence and this may advantageously result in a longer duration of collision pulse and lower acceleration forces on the driver and/or passengers of the vehicle.

The structure may include a structural joint located within the compressible load absorbing structure, the joint being between at least two structural members, the load transfer element being arranged to promote breaking of the structural joint during vehicle crash.

A said structural member may comprise a sub-frame member which is substantially uncrushable during vehicle crash.

A said structural member comprises a suspension tower assembly, or part of a suspension tower assembly such as a wishbone mounting member.

The structural joint may include at least two substantially flat mating faces.

The structural joint may include four said mating surfaces arranged to mate generally within the same plane or substantially parallel planes with groups of two said mating faces being spaced apart by a gap.

The gap may be formed by a generally circular bore formed through the structural joint, a longitudinal axis of the bore being generally parallel to the plane or planes of mating surfaces of the joint.

At least one, preferably two or four, fasteners (such as bolts) may be provided for clamping each two mating faces together. The structural joint includes in one example two lots of two such fasteners, each two said mating faces of part of the joint being joined by two such fasteners.

The load transfer element may be secured to a structural member, the structural member preferably being substantially uncrushable during vehicle crash.

The load transfer element may be arranged to apply load to the load absorbing structure at a location part-way along the uncompressed load absorbing structure.

The compressible load absorbing structure may include at least one elongate tubular-walled member which is arranged to absorb energy by crushing along a longitudinal direction thereof.

At least one said tubular-walled member may be hollow or may contain hollow cells.

At least one said tubular-walled member may be arranged to crush and deform permanently.

At least one said tubular-walled member may be a crushable metal can-like structure.

The compressible load absorbing structure may comprise a plurality of distinct crushable portions, the distinct crushable portions being arranged to crushably deform at different applied crush loads to one another.

The distinct crushable portions may be arranged in an elongate configuration one behind the other in a longitudinal crushing direction.

Three said distinct portions may be arranged one behind the other in the longitudinal crushing direction.

Two said distinct crushable portions may be connected substantially directly to one another.

Two said distinct crushable portions may be spaced apart by a substantially uncrushable rigid structural member, such as a wishbone casting member for holding an end of a suspension wishbone.

The load transfer element may be arranged to extend in a direction generally parallel to a said elongate tubular-walled member.

The load transfer element may have one end fixed to a substantially rigid structural member and the load transfer element may have a free cantilevered distal end opposite to the end fixed to the substantially rigid structural member.

The load transfer element may, at a position approximately half way along its length, be fixed to the crushable load absorbing structure.

The substantially rigid structural member may comprise an upper wishbone mounting member.

The load transfer element may be arranged to begin transmitting load to the load absorbing structure part-way through compression of the load absorbing structure. The point at which the load transfer element begins transmitting load to the load absorbing structure may be during or at the end point of crushing of a first one of said distinct crushable portions to be crushed during vehicle crash.

The load transfer element may have an end located part-way along a said elongate tubular wall element which is arranged to crush before other said tubular wall elements during vehicle crash.

The load transfer element may have a front end positioned part-way along a front-most said tubular wall element.

The load transfer element may have a load surface arranged to receive load from an object into which a motor vehicle is to be crashed, the load surface being located longitudinally between front and rear ends of the compressible load absorbing structure.

The load surface may be at least partially curved. This curving of the load surface is advantageous in that it may prevent the load surface from catching on a deforming/crushing or otherwise in relative terms moving adjacent part of the load absorbing structure.

The compressible load absorbing structure may be arranged to compress at least partially by way of a permanent crushing action.

The crash load absorption structure may comprise part of vehicle front crash load absorption structure.

According to a further aspect of the present invention there is provided a vehicle including a crash load absorption structure in accordance with one or more of the previous aspects of the invention.

In this case, two said crash load absorption structures may be located spaced apart and preferably alongside one another.

The vehicle may include a vehicle engine located at least partially between the crash load absorption structures.

At least one structural member may extend across between the crash load absorption structures at least partly directly in front of the engine.

The present invention may be carried out in various ways and two embodiments of crash load absorption structures for motor vehicles in accordance with the invention will now be described by way of example only and with reference to the accompanying drawings in which:

BRIEF DESCRIPTION OF THE FIGURES

FIGS. 2A to 2D are perspective views showing part of the prior art motor vehicle of FIG. 1 and how a front crash load absorption structure of the vehicle is arranged to crush sequentially in three steps during a substantial front impact;

FIGS. 8A and 8B are perspective views from behind and in front, respectively, of the load transfer element of FIGS. 5, 7A and 7B;

DETAILED DESCRIPTION

Figure 1:
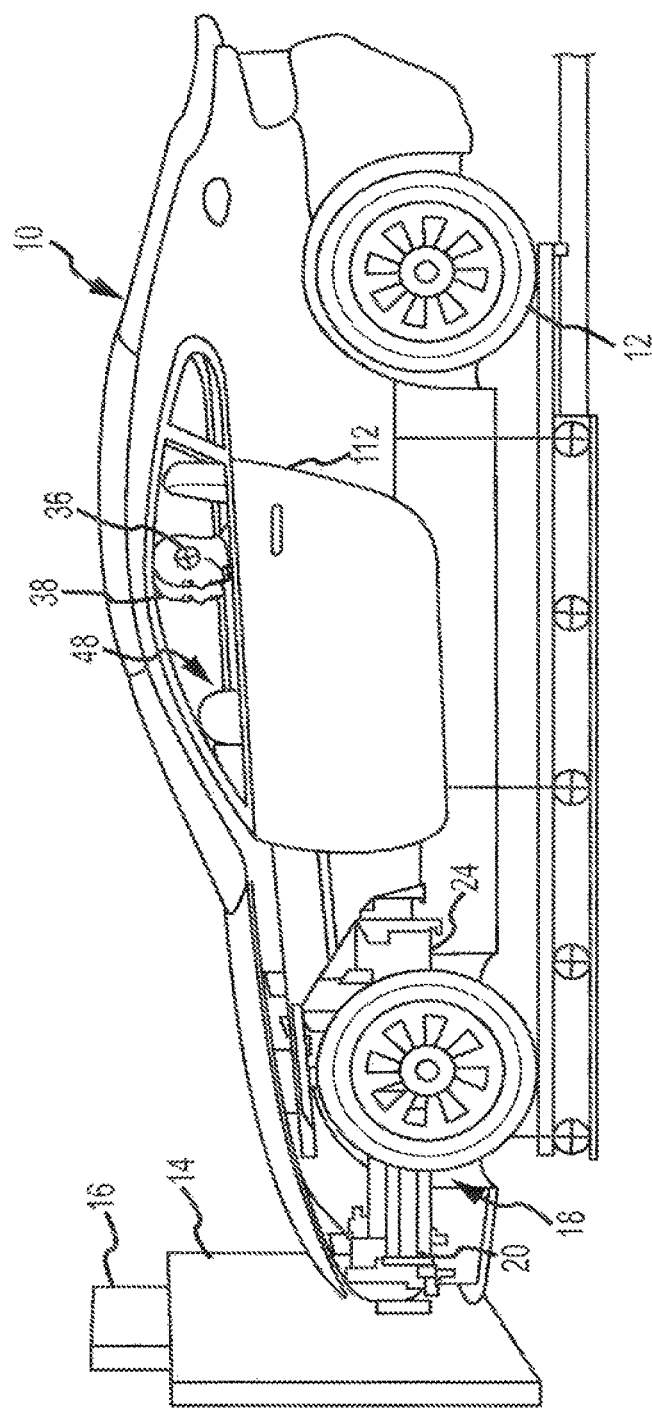
FIG. 1 is a schematic side view of a prior art motor vehicle undergoing a United States Federal front impact test.
Figure 2D:
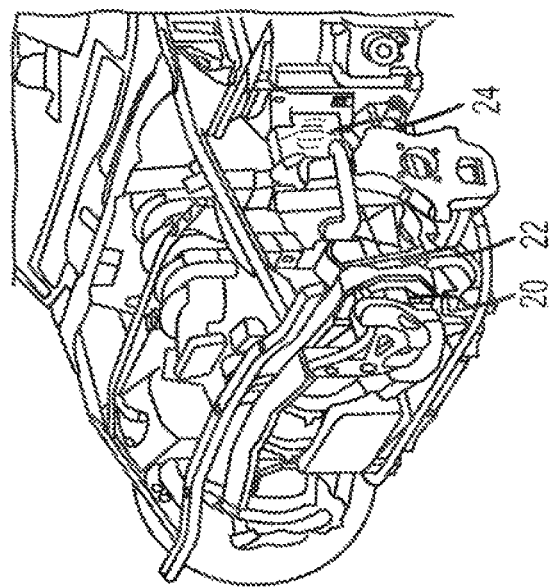
Figure 2C:
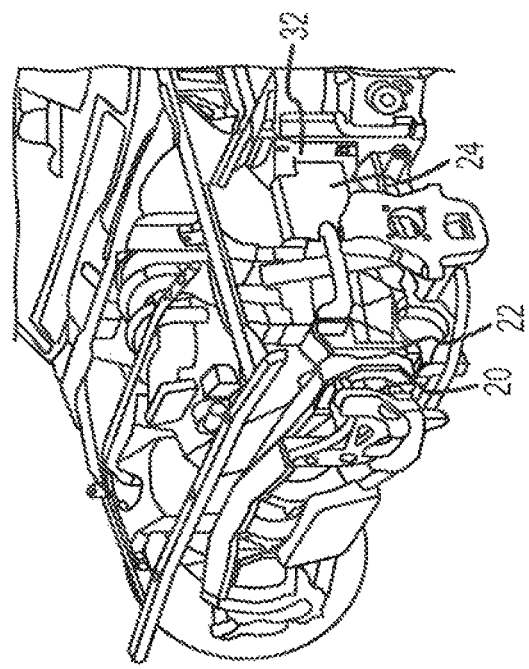
Figure 3:
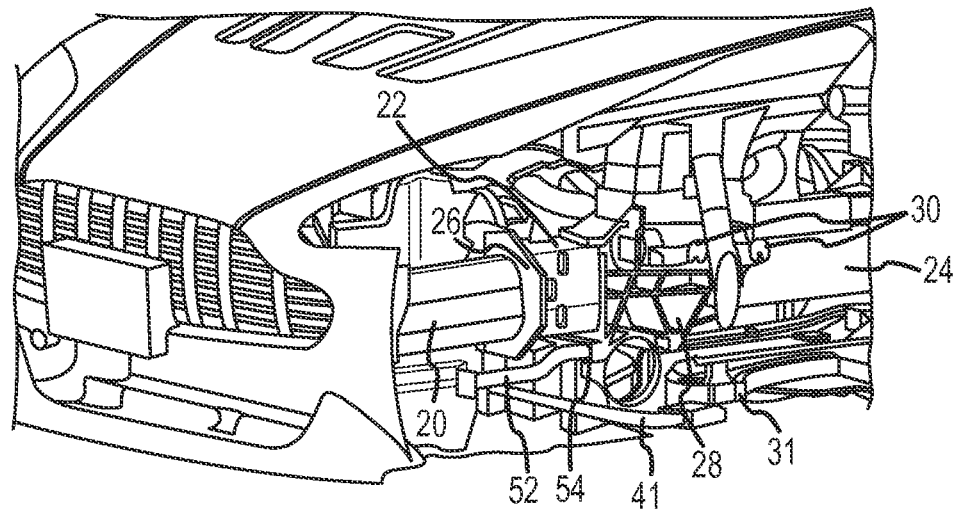
FIG. 3 is a partial quarter perspective and partially sectioned view of a crash load absorption structure for a motor vehicle in accordance with a first embodiment of the present invention.
Figure 4:
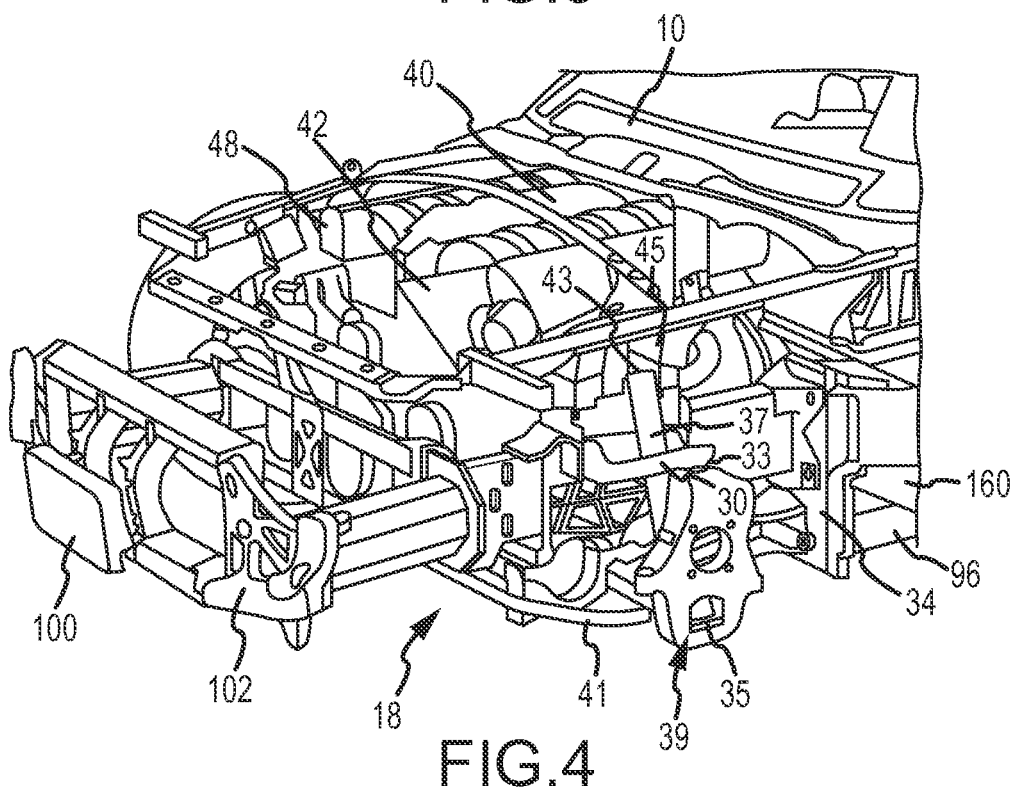
FIG. 4 is a view of the arrangement of FIG. 3 but with certain body panels and other components including a load transfer element not shown, and with certain other elements, such as suspension wishbones and front suspension hub carrier/suspension upright shown.

As shown in FIG. 4, in a first embodiment of a crash load absorption structure 18 in accordance with the present invention, the structure 18 and motor car 10 are generally similar to that shown with reference to FIGS. 1 to 2D. Therefore the same reference numerals are used in this description of the preferred embodiments to those used with reference to FIGS. 1 to 2D in order to denote the same or similar components. One difference which will be seen in FIG. 4 is that the engine 40 of the preferred embodiments is substantially larger than that shown in FIGS. 2A to 2D and its block 42 is substantially longer, and this is due to the fact that the engine in the preferred embodiments is a 6 litre engine with a V12 configuration, with the extra two cylinders in each cylinder bank in particular making the block 42 substantially longer. Although the secondary crush can 22 is 38 mm longer in the preferred embodiments than in the arrangements shown in FIGS. 2A to 2D, this longer secondary crush can 22 being 96 mm long. The lengths of the primary crush can 20 and tertiary crush can 24 are the same in the preferred embodiments of FIGS. 3 to 10D as the equivalent components in FIGS. 2A to 2D at 343 mm and 187 mm, respectively, of crush length between the substantially uncrushable cast components at either end thereof, i.e. between a front interface member 50 and the interface casting 26, and the upper wishbone casting 28 and the rear interface casting 32, respectively. This means that the front 48 of the engine block 42 is further forwards in the preferred embodiments relative to the tertiary crush can 24 than in the arrangement of FIGS. 2A to 2D.

Additionally, as shown in FIGS. 3 and 10A to 10D, in this embodiment, a load transfer element or pusher element 52 is provided secured to a forward facing surface 54 of the upper wishbone casting 28. It will be noted that the load transfer element 52 is not shown in FIG. 4 or FIG. 6 for the purposes of clarity. The load transfer element 52 is a solid bar of aluminium alloy which extends from the upper wishbone casting 28 all of the way along underneath the secondary crush can 22, forward past the interface casting 26 and then along underneath the primary crush can 20. As shown in FIG.

10A, in the undeformed configuration of the front crash load absorption structure 18 the load transfer element 52 extends along to a position under the primary crush can 20 which is about one quarter to one third of the distance along the primary crush can 20 between the interface casting 26 and the front interface member 50. This distance can be tuned in other embodiments to change the point at which the load transfer element starts transferring load. The load transfer element 52 has a flat front face member 56 and includes a first main portion 58 which is straight and horizontal and extends rearwardly from the flat front face member 26, about two thirds of the way from the flat front face member 56 to the forward facing surface 54 of the upper wishbone casting 28. The first main portion 58 merges into a slightly upwardly and rearwardly inclined portion 60 and then into a short horizontal straight rear portion 62 which attaches to the forward facing surface 54 of the upper wishbone casting 28. This configuration means that the load transfer element 52 is spaced downwardly away from the primary crush can 20, interface casting 26 and secondary crush can 22.

Figure 6:
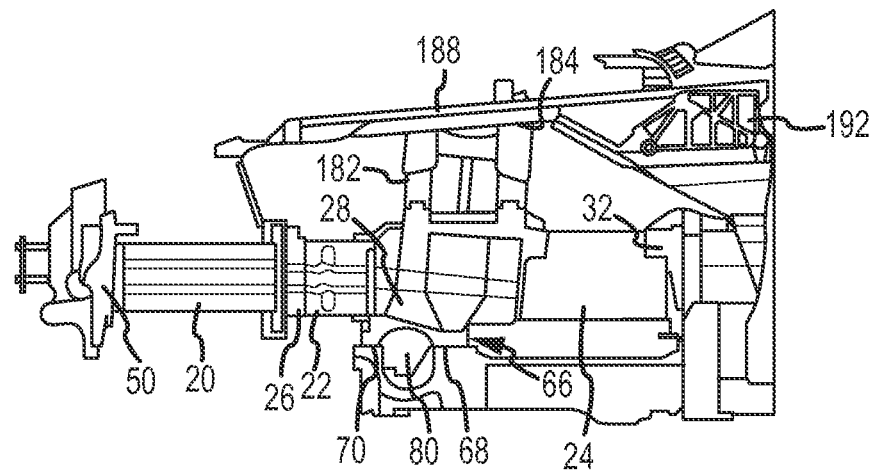
FIG. 6 is a side view of part of the components shown in FIGS. 3 to 5.
Figure 7B:
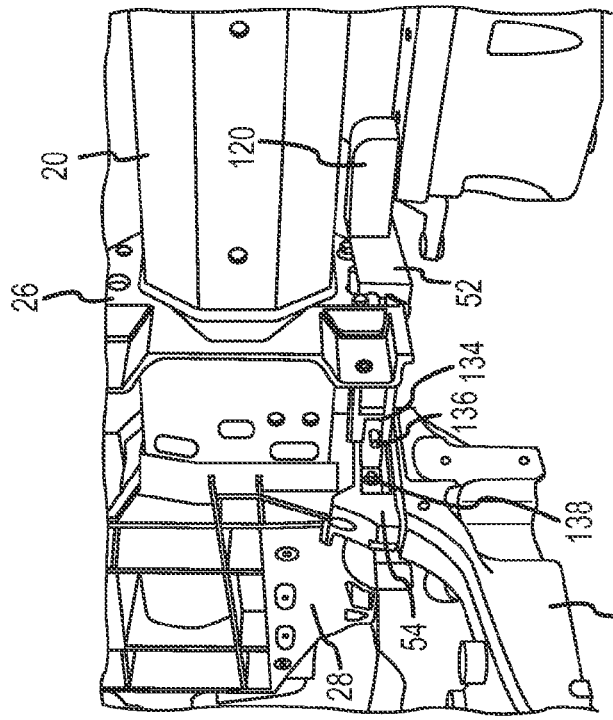
FIGS. 7A and 7B are perspective views from behind and in front, respectively, of the load transfer element of FIG. 5 showing in detail how it is connected to an interface casting and upper wishbone casting.
Figure 7A:
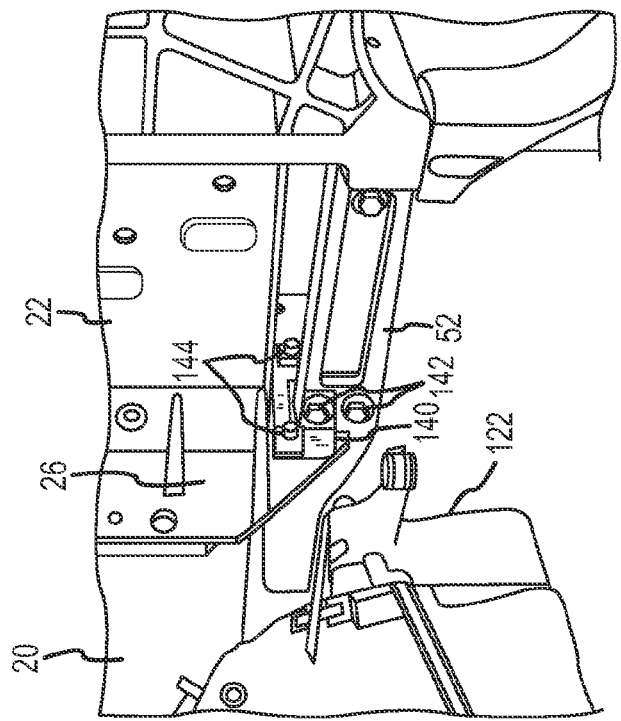
Figure 10B:
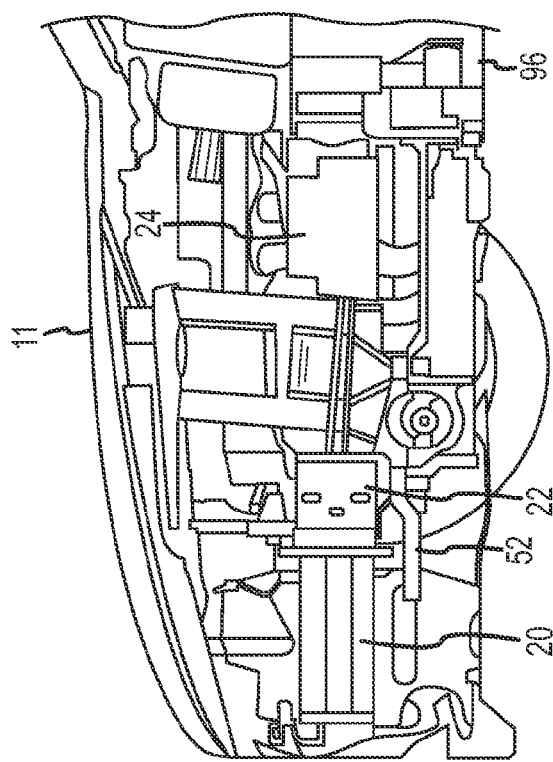
FIGS. 10A to 10D show a simulated crash sequence for the first embodiment of FIG. 3.
Figure 10A:
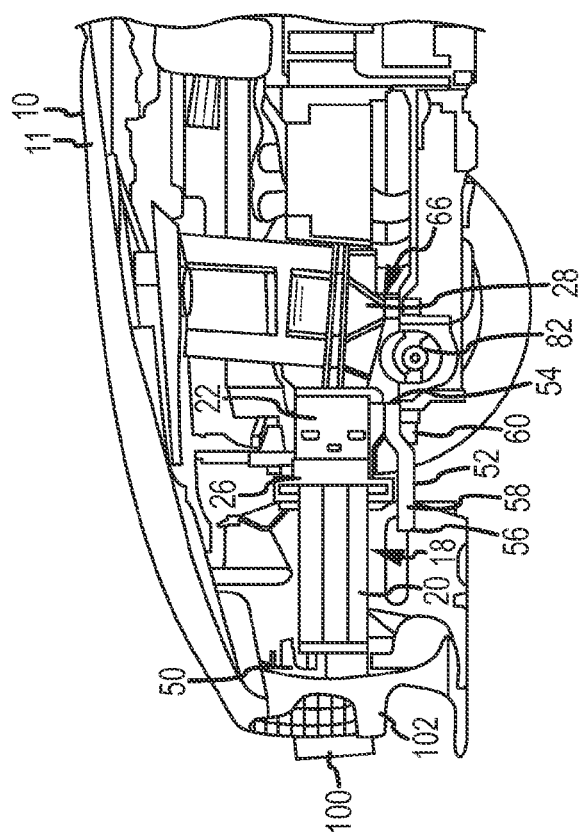

As shown in FIG. 10A, (and FIG. 10D which shows the upper wishbone casting 28 broken way from a lower sub-frame member 64), the upper wishbone casting is joined to the lower sub-frame member at a structural joint 66—this is also shown in FIG. 6. The structural joint 66 consists of two planar surface interface joints 68, 70, which are in the same plane or substantially the same plane as one another, between two pairs of substantially planar surfaces 72, 74 and 76, 78 (see FIGS. 10C and 10D as well as FIG. 6). The planar surface interface joints 68, 70 are spaced apart by a cylindrical gap 80 (FIG. 6) through which a steering rack 82 of the motor car 10 passes (FIG. 10A). It will be appreciated that the steering rack 82, wishbones 30 and lower wishbone 31 (FIG. 3) are connected via pivots 33, 35 to a hub carrier and a spring/damper strut 37 extends from near lower part 39 of the lower wishbone 31 as does a front roll bar 41 so as to provide steerable front double wishbone suspension. A top end portion 43 of the strut 37 is attached to or sits in a top 45 of suspension tower 182.

Two fastening bolts (not shown) which are M12 grade 10.9 bolts, pass vertically through the structural joint 66 through bores (not shown) in the lower sub-frame member 64 into threaded bores (not shown) in the upper wishbone casting 28, each planar surface interface joint 68, 70 having two of said bolts and bores spaced apart from one another laterally. It will be noted that the load transfer element 52 is attached to the forward facing surface 54 of the upper wishbone casting 28 just above the front planar surface interface joint 70 (FIG. 6 where the load transfer element 52 is not shown for the purposes of clarity—see also FIG. 10A).

The primary can 20 is a hollow octagonal tube formed with three cells (not shown) by virtue of two internal horizontal plates extending between the top and bottom edges 84, 86 of respective outer 88 and inner 90 vertical wall parts thereof. The material of the primary crush can 20 is three millimeter 6060T7 alloy with a yield strength of 140 MPa. The secondary crush can 22 is a rectangular tube having three cells (not shown) formed by two horizontal plates extending across between outer 92 and inner 94 vertical walls of the crush can 22 and is made of three millimeter 6060T6 alloy with a yield strength of 200 MPa. The tertiary crush can 24 is a hexagonal tube with only one cell, i.e. it is hollow with no internal plates, and has a wall thickness of 2.4 mm and is also of 6060T6 alloy. An under floor longitudinal member 96 extends rearwardly from a lower portion 98 of the front structure mounting member 34. The under floor longitudinal member 96 is a rectangular hollow tube with 2 mm wall thickness and is of 6060T6 alloy. During vehicle crash, the primary crush can 20, secondary crush can 22, tertiary crush can 24, and under floor longitudinal member 96 are arranged to deform permanently with a crushing action to absorb the energy of the vehicle during the crash. In contrast, the front interface member 50, interface casting 26, upper wishbone casting 28, rear interface casting 32 and lower sub-frame member 64 are substantially rigid and uncrushable. The cans 20, 22, 24 and underfloor longitudinal member 96 are all tuneable in alloy grade and wall thickness in order to suit other applications in other types of vehicle, as required.

FIGS. 10A to 10D show sequentially a collision in which the vehicle 10 is projected at 35 mph (15.65 meters per second) straight into a solid immovable rigid object 16 (FIG. 1) with its flat front wall 16 perpendicular to the direction of projection of the vehicle 10. The collision is simulated in these figures using a computer aided engineering finite element analysis model in which the model has been correlated first with the load transfer element 52 absent between an actual and CAE collisions at 25 mph (11.18 meters per second), that correlated finite element model then being analysed at 35 mph and the load transfer element 52 added to the model.

FIG. 10A shows a front portion 11 of the vehicle including the front crash load absorption structure 18 at a time 0 seconds into the collision, i.e. at the actual point of impact of the vehicle into the substantially rigid immovable object 16. FIG. 10B shows the front portion 11 of the motor car at a time 10 ms into the collision when it will be seen that a front plinth 100 and front bumper structure 102 have been compressed but there is no discernable compression of the front crash load absorption structure 18 including the primary 20, secondary 22, tertiary 24 crush cans or under floor longitudinal member 96. In this position, the load transfer element or pusher element 52 has no effect since it is cantilevered forwards from the front wishbone casting 28 and its flat front face member 56 is not taking load.

Figure 10C:
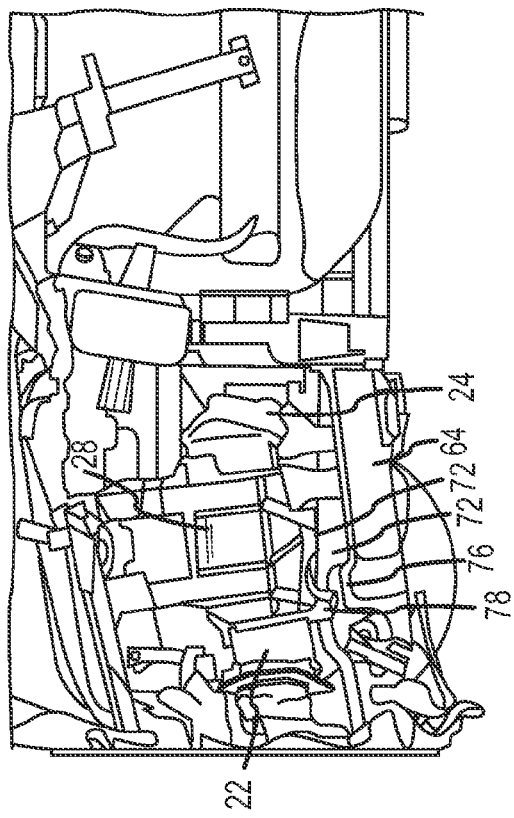
Figure 10D:
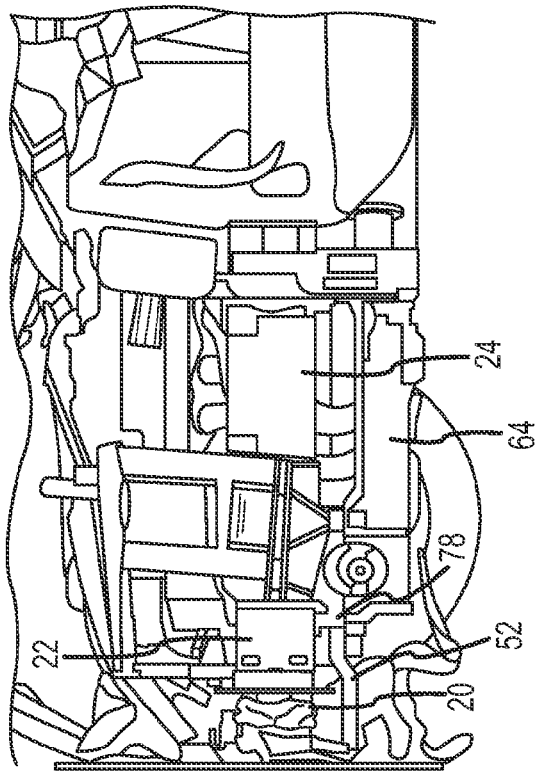

FIG. 10C shows the collision at a time of 35ms into the collision pulse at a point in time when the front flat face member 56 of the load transfer element 52 suddenly is in collision with the substantially rigid immovable object 16 through what is left of the front bumper structure 102 (which is relatively insignificant from the point of view of forces in this collision). It will be seen that at this point in time, the primary crush can 20 is substantially or fully at the end of its crushing action but the secondary 22 and tertiary 24 crush cans have not yet started to crush. At this point in time therefore, or shortly before or after it, the substantially rigid load transfer element 52 directly places a substantial load onto the front crash load absorption structure 18 at a point which is part way along what was the undeformed structure of FIG. 10A, and indeed what is still partway along the deformed structure of FIG. 10C, namely at the upper wishbone casting 28. The application of this substantial force by the load transfer element 52 to the upper wishbone casting 28, causes the structural joint 66 to break due to breaking of the four M12 bolts (not shown) holding the structural joint 66 together, the force applied by the load transfer element 52 to the upper wishbone casting 28 being close to and parallel to the plane of the planar surface interface joints 68, 70. The substantially rigid upper wishbone casting 28 is therefore able to break away from the lower sub-frame member 64 before the secondary crush can 22 has compressed significantly. The front portion 11 of the motor car 10 then changes to the configuration shown in FIG. 10D at a point in time approximately 67.5 ms into the collision pulse in which it will be seen that the secondary crush can 22 is generally undeformed, but the tertiary crush can 24 is substantially deformed. The early promotion of crushing further back in the load absorption structure 18 namely at the tertiary crush can 24 is, surprisingly, highly advantageous and the breaking of the structural joint 66 helps with this.

Figure 11A:
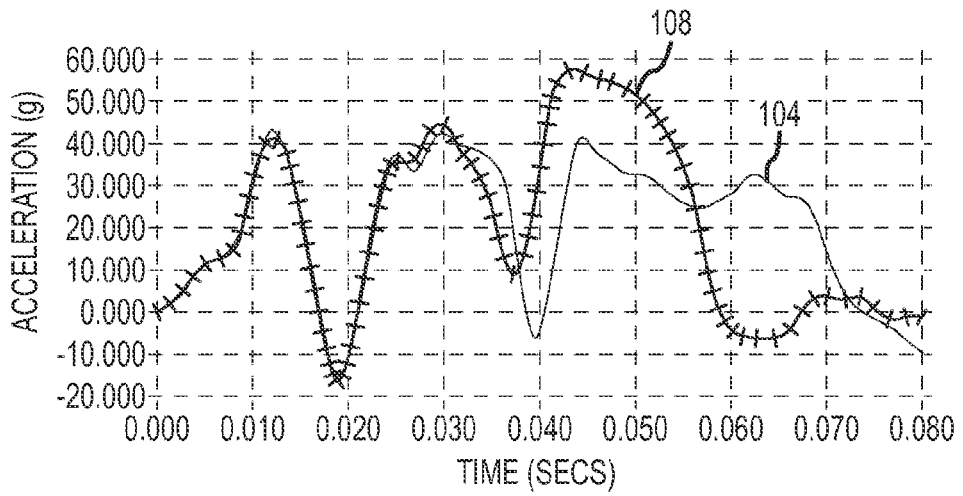
FIGS. 11A and 11B are computer modelling of average B-post acceleration and velocity (i.e., average of measured left and right B-posts to damp out noise) during United States of America Federal front impact tests for a $50^{th}$ percentile driver at 35 miles per hour (15.6 meters per second)
Figure 11B:
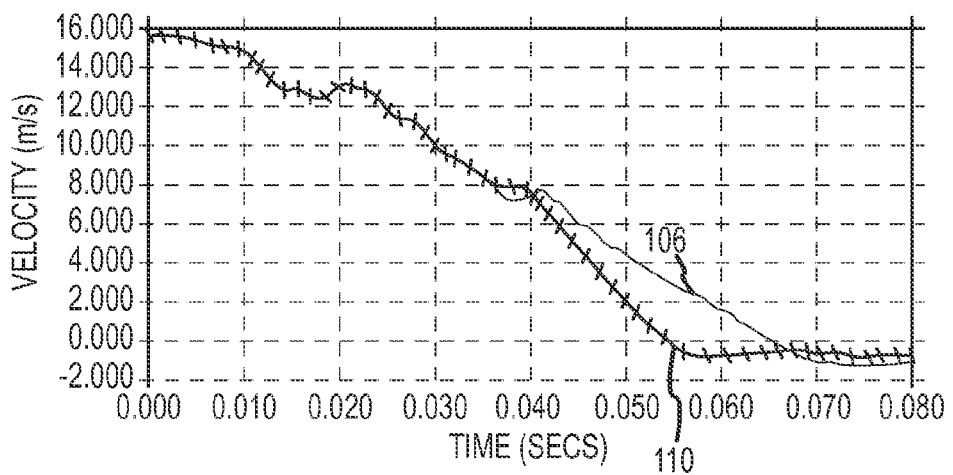
Figure 12A:
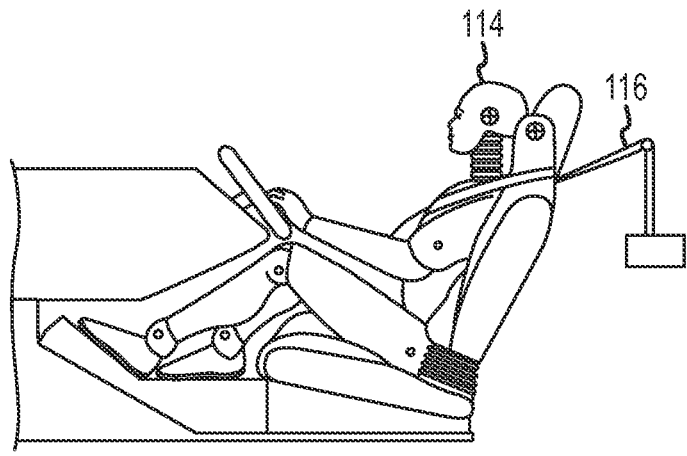
FIGS. 12A to 12D are Madymo (trade mark) crash dummy simulations for the collisions of FIGS. 10A to 10D and 9A to 9D.
Figure 12B:
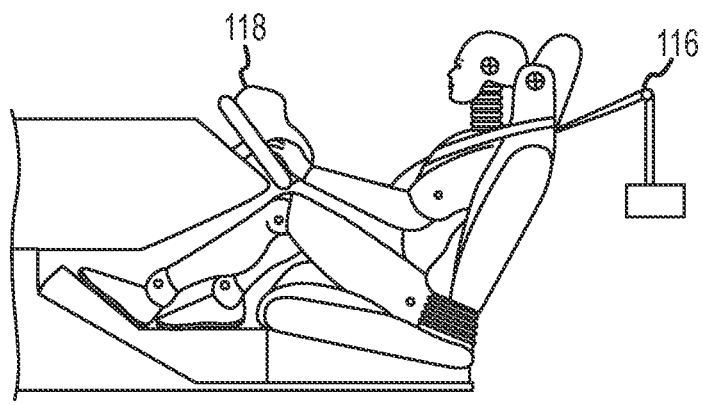
Figure 12C:
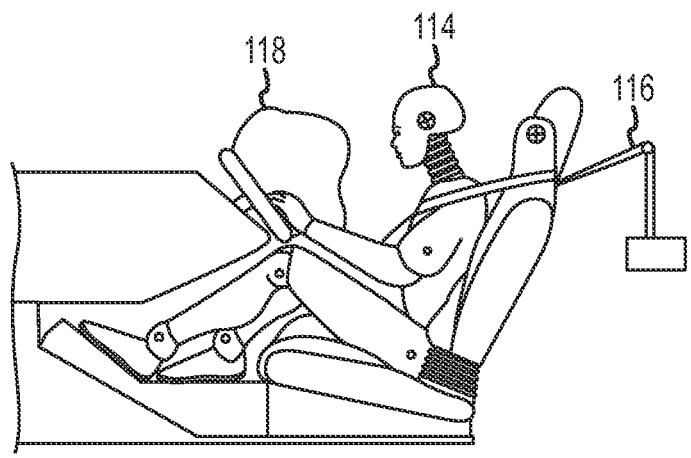
Figure 12D:
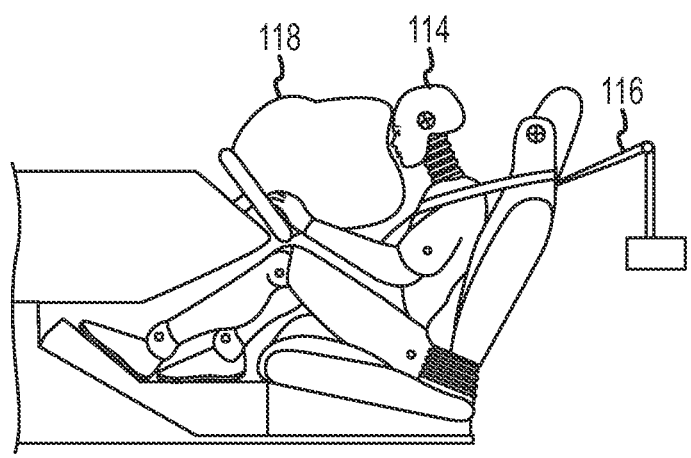

FIGS. 11A and 11B are graphs showing acceleration in G and velocity in meters per second for the collision shown in FIGS. 10A to 10D as well as a collision for an identical model but with the load transfer element 52 removed. The graphs in solid lines 104, 106 are for the model of FIGS. 10A to 10D and the graphs in solid lines with sideways hatching 108, 110 are for the collision with the load transfer element 52 absent from the model. These two graphs are for average vehicle B-post data. Madymo (trade mark) crash dummy prediction software for a $50^{th}$ percentile driver 114 restrained by seatbelt 116 and airbag 118 can then be used to compute occupant parameters from the B-post data, as simulated in FIGS. 12A to 12D. FIG. 12A is 20 ms into the collision pulse, FIG. 12B 30 ms into the collision pulse, FIG. 12C 40 ms into the collision pulse and FIG. 12D 50 seconds into the collision pulse. The B-post graphs predict a time to zero velocity of 55 ms without the load transfer element 52 but 65 ms with the load transfer element as shown in FIGS. 10A to 10D. The likelihood of occupant injury is therefore improved (i.e., lowered) and peak B-post acceleration is significantly lower too.

Figure 5:
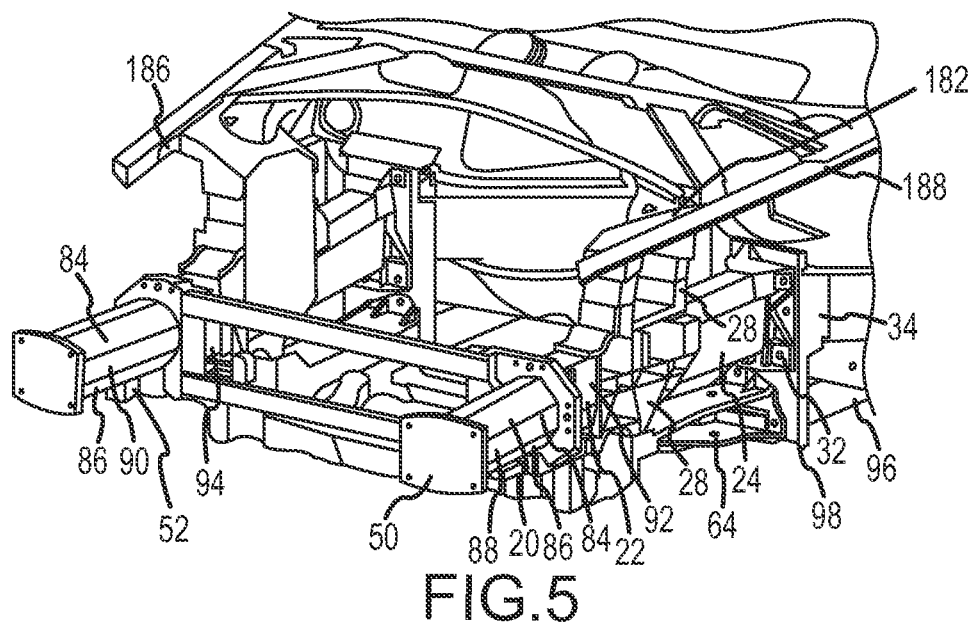
FIG. 5 is a view of the embodiment of FIG. 3 but with many parts not shown for the purposes of clarity, and with a modified load transfer element thereof modified so as to form a second embodiment of a crash load absorption structure for a motor vehicle in accordance with the invention.

FIGS. 7A to 9D and also FIG. 5 show a slightly different embodiment in which the load transfer element 52 has a slightly modified shape in order for a front 120 thereof to have clearance above an engine air intake air box 122 for the engine 40. The load transfer element 52 in this embodiment is also attached part way along its length to the interface casting 26 which is slightly modified for the purpose. The transfer element 52 has weight reduction channels 126, 128 formed in a rear main horizontal portion 130 thereof, as well as a rear mounting through-bore 131 and two forward mounting through-bores 134, 136 and is otherwise a solid bar of aluminium alloy which is substantially rigid during vehicle collision. The rear main horizontal portion 130 of the load transfer element 52 abuts against the forward facing surface 54 of the upper wishbone element/casting 28 and is held in position thereagainst by an L-shaped bracket 134 having a first bolt 136 passing through the rear bore 131 and a second bolt 138 secured into the upper wishbone casting 28. Near the front of the main horizontal portion 130 of the load transfer element 52, the load transfer element 52 is braced by being secured via a bracket 140 to the interface casting 26 by virtue of fasteners (bolts) 142 connecting the load transfer element 52 to the bracket 140 and fasteners/bolts 144 attaching the bracket 140 to the interface casting 26. The rear main horizontal portion 130 of the load transfer element 52 merges via an upwardly and forwardly directed portion 148 into the front end portion 120 thereof. The load transfer element 52 has a front load accepting surface 150 which has a radiused top corner edge 152, which advantageously prevents the crumpling/crushing primary can 20 from catching on the load transfer element 52 during crushing of the primary can 20.

Figure 9B:
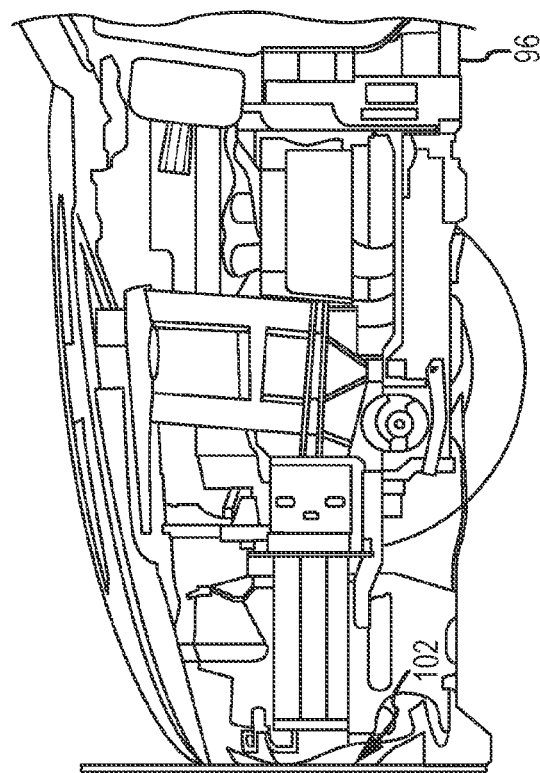
FIGS. 9A to 9D show a simulated crash sequence for the second embodiment of FIGS. 5 and 7A to 8B.
Figure 9A:
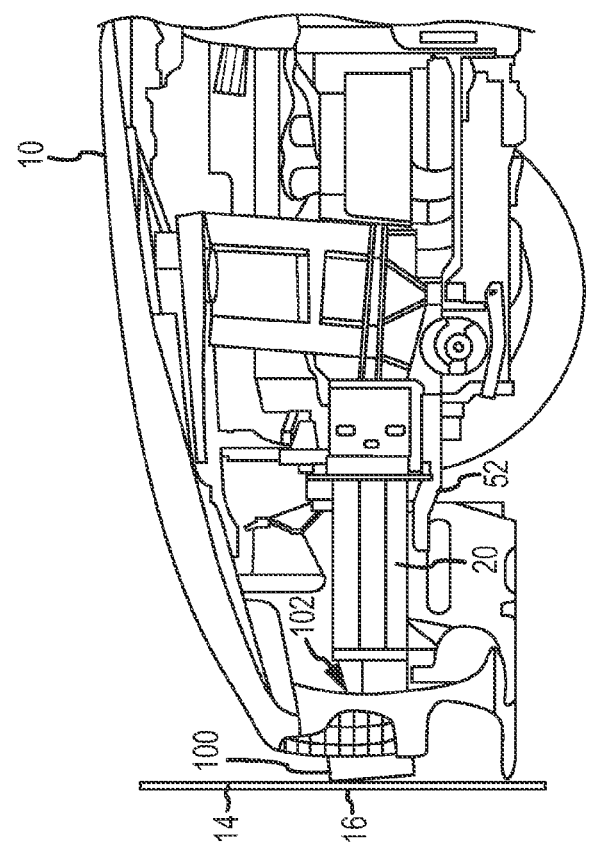
Figure 9D:
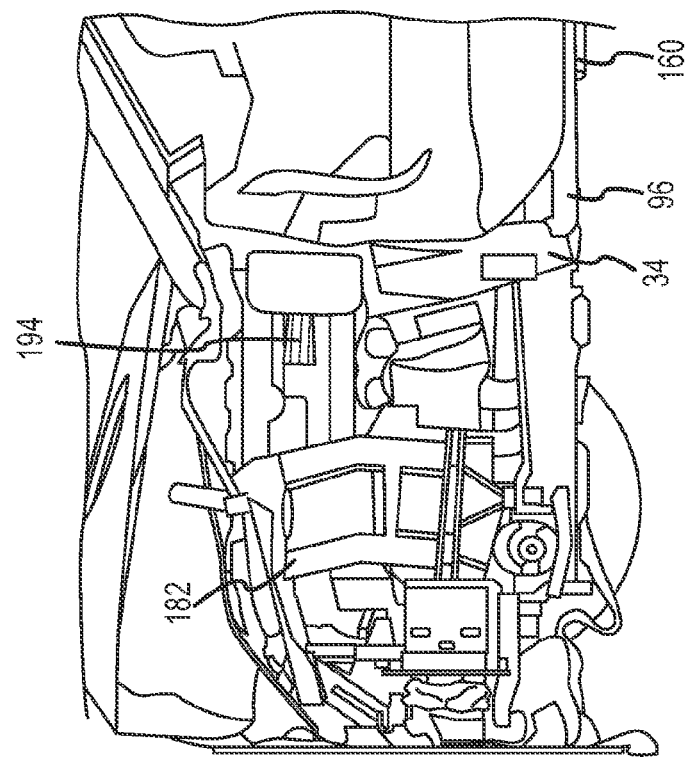
Figure 9C:
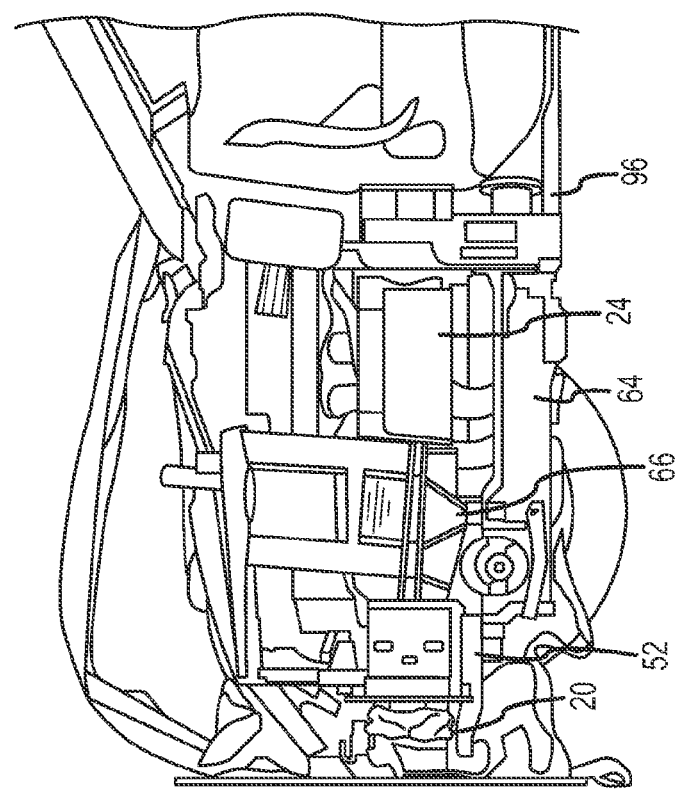

FIGS. 9A to 9D show a collision for this second embodiment driven into the flat front wall 14 of the substantially rigid immovable object 16 at 35 mph (15.65 meters per second). In FIG. 9A, this is the point in time when the collision begins. In FIG. 9B, the front plinth 100 and front bumper structure 102 are substantially compressed but the primary 20 secondary 22 tertiary 24 crush cans and the under floor longitudinal member 96 are not compressed. Further into the collision, as shown in FIG. 9C, the front crush can or primary crush can 20 is substantially compressed and the secondary crush can 22 tertiary crush can 24 and under floor longitudinal member 96 are substantially undeformed. The front face 150 of the load transfer element or pusher 52 is just about to come into contact with the flat front wall 14 of the substantially rigid immovable object 16 and the radiused top edge 152 has ensured that the crumpled primary crush can 20 has not caught on and become entangled with the load transfer element 52. At this point in time in this actual, (i.e. non-simulated) crash sequence, the load transfer element 52 is just about to transfer suddenly substantial load to the front face 54 of the upper wishbone casting 28. Although this substantial force promotes breakage of the structural joint 66 between the upper wishbone member 28 and the front sub-frame member 64, the joint 66 does not actually break on this occasion due to friction in the mating surfaces 72, 74, 76, 78 of the joint 66. Substantial load is therefore transferred by the load transfer element 52 directly to the front crash load absorption structure 18 at a position partway along its length, namely at the front surface 54 of the upper wishbone casting 28. Part of this force is transferred through the substantially rigid and uncrushable upper wishbone casting 28 to the tertiary crush can 24 but part of the force is also transferred through the structural joint 66 and the substantially rigid and uncrushable lower sub-frame member 64 and via the front structure mounting member 34 to the under floor longitudinal member 96 which is rearwardly attached to a further structural member 160 of the body structure of the motorcar 10. Accordingly, in the transition between the configuration of FIG. 9C to the configuration of FIG. 9D which is further into the collision, there is substantial crushing of the tertiary crush can 24 and the under floor longitudinal member 96 also crushes and the lower end 98 of the front structure mounting member 34 hinges backward to accommodate relatively rearward movement of the lower sub-frame member 64.

Figure 11C:
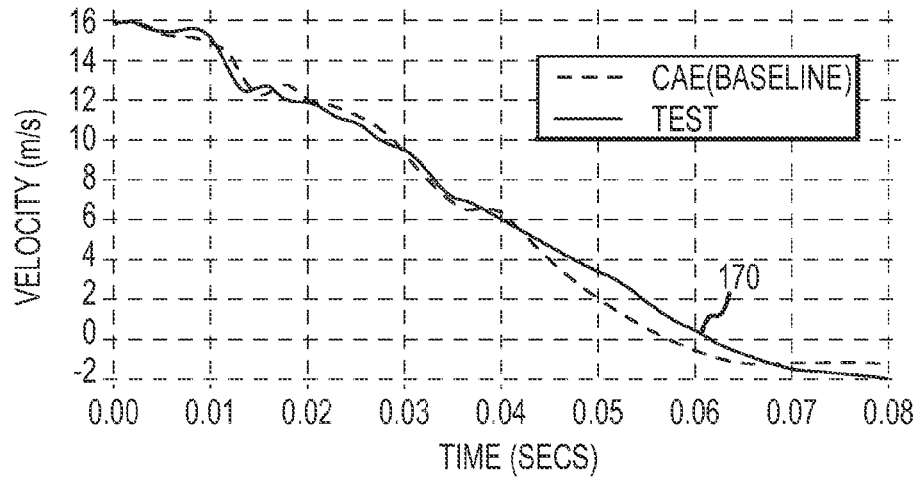
FIG. 11C is a graph of vehicle B-post velocity curves for the United States Federal front impact test for a $50^{th}$ percentile driver at 35 miles per hour (15.65 meters per second) both for a computer aided engineering prediction for the second embodiment of FIGS. 5 and 7A to 9D without the load transfer element thereof, and as actually tested with the load transfer element fitted.

FIG. 11C is a velocity graph for the vehicle B-post 112 where the graph in a solid line 170 shows the velocity of the B-post in the actual test crash of FIGS. 9A to 9D and the graph in the dashed line is a computer aided engineering baseline simulation for the B-post with the load transfer element 52 absent. It can be seen that the velocity gradient is less steep in the region after approximately 42 ms into the crash pulse, thereby indicating a lower acceleration at the vehicle B-post 112 and the B-post reaches a zero velocity at a later time. Accelerations for the occupants are therefore also generally improved as can be predicted with the Madymo (trade mark) prediction software. The early transfer of the collision impulse to the tertiary crush can 24 and under floor longitudinal member 96 advantageously and surprisingly allows the length of duration of the acceleration pulse to be extended and initiates a collapse further back on these components earlier on in the collision at a relatively low load. It is noted that this is despite the fact that the secondary can 22 is not significantly crushed in the collision between the configurations of FIGS. 9C and 9D. The configuration of 9D (and indeed also the configuration of 10D) is when the components are fully crushed in the collision, before slight spring-back of the vehicle.

A further feature is that as shown in FIGS. 5 and 6, a shock tower system 182 is secured on top of the upper wishbone casting 28 and is secured by strong brackets 184, 186 to a generally horizontal structural member 188 known as a "shotgun member", the shotgun member 188 being firmly secured to a middle substantially uncrushable A-post member (not shown) rearwards behind member 192. As can be seen from FIGS. 9D and 10D, the brackets 184, 186 remain holding onto the shotgun member 188 so that the shock tower 182 does not noticeably move backwards relative to the body of the vehicle 10 during the collision, and the shock tower 182 does not break off the shotgun member 188. This advantageously prevents the shock tower 182 from undesirably colliding with brake components 194 of the motor car 10 which could undesirably cause the transmission of a sudden very high load through the motor car's brake pedal (not shown) which could hurt a foot of the driver which is on the brake pedal and attempting to slow the motor car prior to and upon collision.

A further advantage of the load transfer element 52 of the preferred embodiments is that its length can easily be adjusted to tune the collision characteristics for modified or newly engineered vehicle platforms, such as when engine sizes are changed. The material of the load transfer element 52, which in the above examples is 6082 alloy in T6 temper, and its shape and configuration can also be changed/tuned for other applications.

The presence of the load transfer element 52 provides the motor car 10 with very good collision characteristics when in a frontal impact into a solid immovable object such as a test impact barrier or an object like a steel reinforced bridge support at the side of a road, and the road transfer element 52 does not negatively affect the collision characteristics of the motor car 10 under different crash conditions, such as during offset collisions or side impacts.

The present invention may be carried out in various ways and various modifications are envisaged to the embodiments described without extending outside the scope of the invention as defined by the accompanying claims.

The invention claimed is:

1. A crash load absorption structure for a motor vehicle, the structure comprising
    a compressible load absorbing structure having a front crushable member and a rear crushable member and being arranged to compress under a crash load along a generally longitudinal direction, wherein the front crushable member and the rear crushable member are distinct from one another and are arranged lengthwise one behind the other in a longitudinal crushing direction; and
    a load transfer element having a rear end coupled to the rear crushable member and a cantilevered, front end, wherein the front end of the load transfer element is arranged so that the load transfer element initiates transmission of the crash load to the rear crushable member part-way through compression of the front crushable member.

2. The crash absorption structure of claim 1 further comprising a structural joint located within the compressible load absorbing structure, the joint being between at least two structural members, the load transfer element being arranged to promote breaking of the structural joint during vehicle crash.

3. The crash absorption structure of claim 2, wherein one of the at least two structural members comprises a sub-frame member which is substantially uncrushable during vehicle crash.

4. The crash absorption structure of claim 2, wherein one of the at least two structural members comprises one of a suspension tower assembly or part of a suspension tower assembly such as a wishbone mounting member.

5. The crash absorption structure of claim 2, wherein the structural joint comprises at least two substantially flat mating surfaces.

6. The crash absorption structure of claim 5, wherein the at least two substantially flat mating surfaces comprises four mating surfaces arranged to mate generally within the same plane or substantially parallel planes with groups of two mating surfaces being spaced apart by a gap.

7. The crash absorption structure of claim 6, wherein the gap is formed by a generally circular bore formed through the structural joint, a longitudinal axis of the bore being generally parallel to the plane or planes of the mating surfaces of the joint.

8. The crash absorption structure of claim 6 further comprising at least one fastener clamping each of the two mating surfaces together.

9. The crash absorption structure of claim 2, wherein the load transfer element is arranged to apply load to the load absorbing structure at a location part-way along the load absorbing structure when uncompressed.

10. The crash absorption structure of claim 2, wherein the compressible load absorbing structure is arranged to compress at least partially by way of a permanent crushing action.

11. The crash absorption structure of claim 2, wherein the crash load absorption structure comprises part of a vehicle front crash load absorption structure.

12. The crash absorption structure of claim of claim 1, wherein the load transfer element is secured to a structural member, the structural member being substantially uncrushable during vehicle crash.

13. The crash absorption structure of claim 1, wherein the compressible load absorbing structure comprises at least one elongate tubular-walled member configured to absorb energy by crushing along a longitudinal direction thereof.

14. The crash absorption structure of claim 13, wherein the at least one tubular-walled member is hollow or contains hollow cells.

15. The crash absorption structure of claim 13, wherein the at least one tubular-walled member is arranged to crush and deform permanently.

16. The crash absorption structure of claim 13, wherein the at least one tubular-walled member is a crushable metal can-like structure.

17. The crash absorption structure of claim 13, wherein the load transfer element is arranged to extend in a direction generally parallel to an elongate tubular-walled member of the at least one elongate tubular-walled member.

18. The crash absorption structure of claim 13, wherein the front end of the load transfer element is located part-way along an elongate tubular-walled member of the at least one elongate tubular-walled member which is arranged to crush before other elongate tubular-walled members of the at least one elongate tubular-walled member during vehicle crash.

19. The crash absorption structure of claim 13, wherein the front end of the load transfer element is positioned part-way along a front-most elongate tubular-walled member of the at least one elongate tubular-walled member.

20. The crash absorption structure of claim 1, wherein the front and rear crushable members are arranged to crushably deform at different applied crush loads to one another.

21. The crash absorption structure of claim 1 further comprising a distinct, intermediate crushable member arranged between the front and rear crushable members in the longitudinal crushing direction.

22. The crash absorption structure of claim 21, wherein two of the distinct crushable members are connected substantially directly to one another in an elongate configuration one behind the other.

23. The crash absorption structure of claim 21, wherein two of the distinct crushable members are spaced apart by a substantially uncrushable rigid structural member.

24. The crash absorption structure of claim 1, wherein the rear end of the load transfer element is fixed to a substantially rigid structural member.

25. The crash absorption structure of claim 24, wherein the substantially rigid structural member is attached to the rear crushable member of the compressible load absorbing structure.

26. The crash absorption structure of claim 24, wherein the substantially rigid structural member comprises an upper wishbone mounting member.

27. The crash absorption structure of claim 1, wherein the rear crushable member of the compressible load absorbing structure is spatially separated from the front crushable member.

28. The crash absorption structure of claim 1, wherein the front end of the load transfer element has a load surface arranged to receive load from an object into which a motor vehicle is to be crashed, the load surface being located longitudinally between front and rear ends of the compressible load absorbing structure.

29. The crash absorption structure of claim 28, wherein the load surface is at least partially curved.

30. The crash absorption structure of claim 1, wherein the load transfer element is substantially rigid.

31. A vehicle including a crash load absorption structure comprising a compressible load absorbing structure having a first crushable member and a distinct, second crushable member arranged lengthwise one behind the other and spatially separated from one another along a generally longitudinal direction; and a load transfer element having a free, first end positioned adjacent the first crushable member and a second end coupled to the second crushable member, wherein the load transfer element is arranged to begin transmitting a crash load to the second crushable member after the first crushable member is partially compressed.

32. The vehicle of claim 31, further comprising two of the crash load absorption structures located spaced apart and alongside one another.

33. The vehicle of claim 32, further comprising a vehicle engine located at least partially between the crash load absorption structures.

34. The vehicle of claim 33, further comprising at least one structural member extending across between the crash load absorption structures directly in front of the engine.

35. The vehicle of claim 31, wherein the load transfer element is substantially rigid.

* * * * *

UNITED STATES PATENT AND TRADEMARK OFFICE
CERTIFICATE OF CORRECTION

| | | |
|---|---|---|
| PATENT NO. | : 9,039,070 B2 | Page 1 of 1 |
| APPLICATION NO. | : 13/014608 | |
| DATED | : May 26, 2015 | |
| INVENTOR(S) | : Roland Snell et al. | |

It is certified that error appears in the above-identified patent and that said Letters Patent is hereby corrected as shown below:

In the claims,

In claim 12, at column 12, line 18, delete the second instance of "of claim"

Signed and Sealed this
Fifth Day of January, 2016

Michelle K. Lee
*Director of the United States Patent and Trademark Office*